Figure 1:
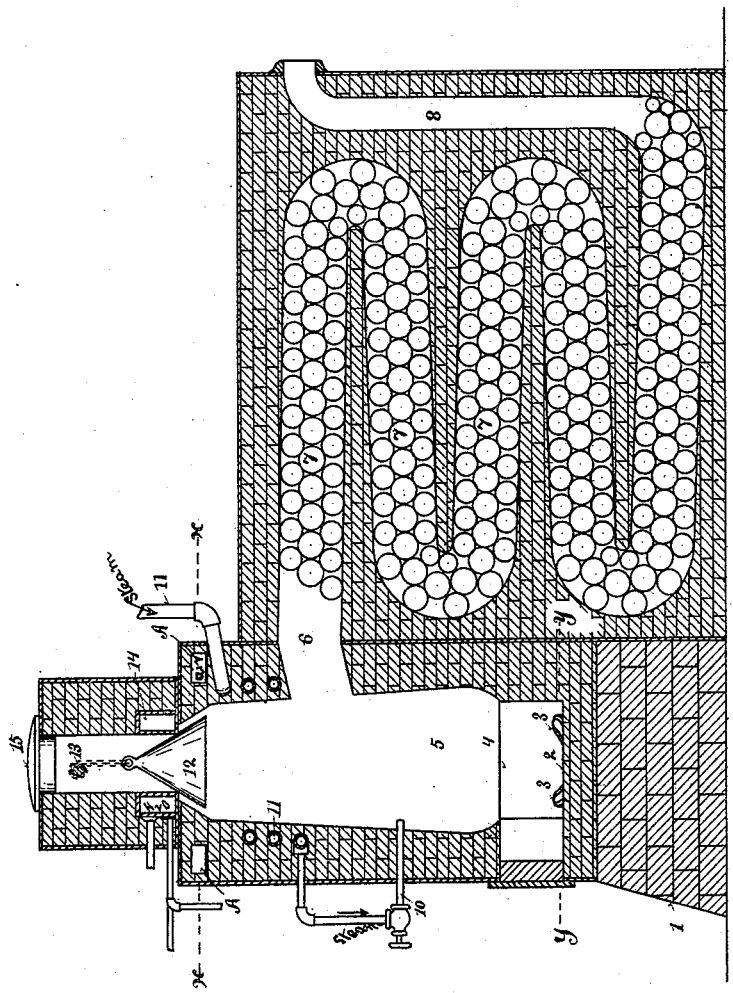

(No Model.) 2 Sheets—Sheet 1.

W. H. HARRIS.
PROCESS OF GENERATING GAS.

No. 478,425. Patented July 5, 1892.

Witnesses
C. W. Miles
T. Simmons

Inventor
William H. Harris
By his Attorneys Word & Boyd (No Model.) 2 Sheets—Sheet 2.
W. H. HARRIS.
PROCESS OF GENERATING GAS.
No. 478,425. Patented July 5, 1892.
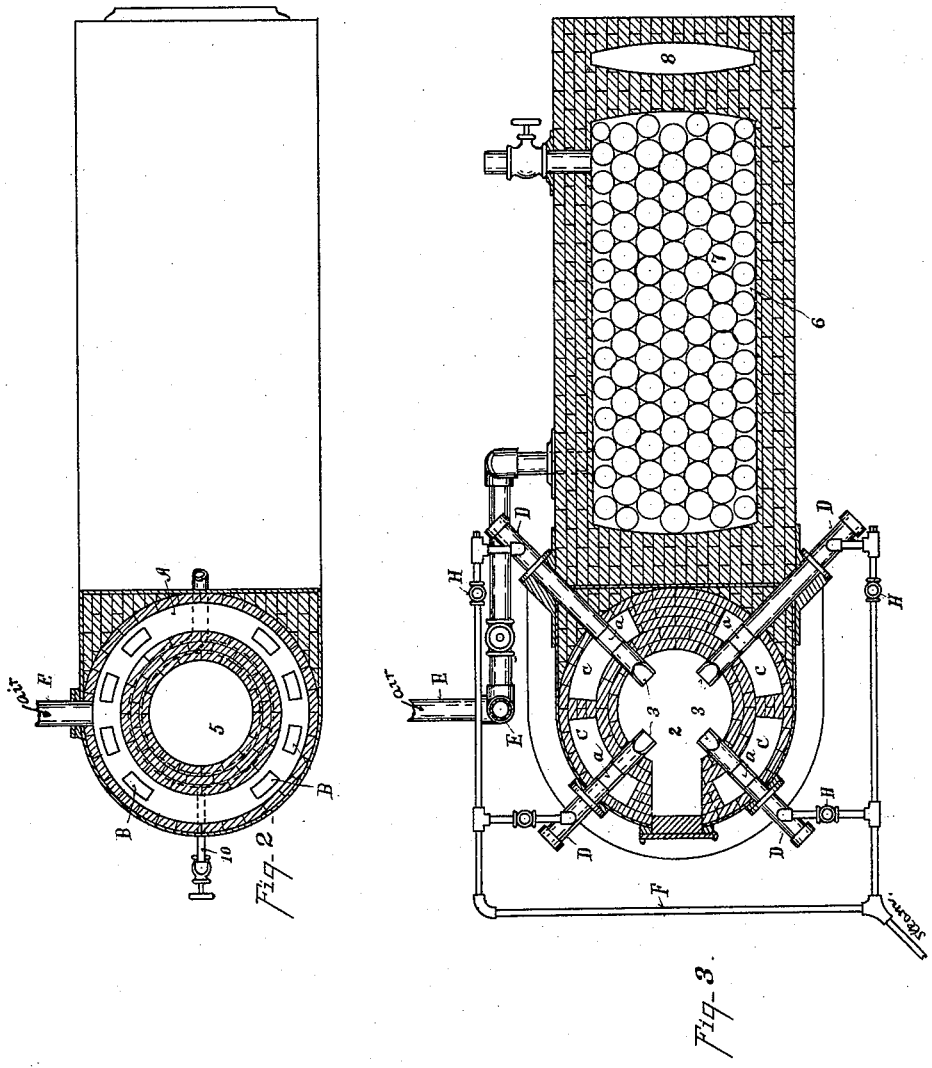
Witnesses
C. W. Miles
T. Simmons
Inventor
William H. Harris
By his Attorneys

UNITED STATES PATENT OFFICE.

WILLIAM H. HARRIS, OF BOSTON, MASSACHUSETTS.

PROCESS OF GENERATING GAS.

SPECIFICATION forming part of Letters Patent No. 478,425, dated July 5, 1892.

Application filed October 6, 1891. Serial No. 407,934. (No model.)

*To all whom it may concern:*

Be it known that I, WILLIAM H. HARRIS, a citizen of the United States, and a resident of Boston, in the county of Suffolk and State of Massachusetts, have invented certain new and useful Improvements in Processes of Generating Gas, of which the following is a specification.

My invention relates to a process for making gas with a modified form of the apparatus shown in an application filed by me April 30, 1891, Serial No. 391,111, for which Letters Patent No. 463,965 were granted to me November 24, 1891.

The object of my invention is to generate gas from bituminous coal mixed with cannel-coal or with other hydrocarbon, steam and air being supplied thereto, by which the various gases are generated at different points and mixed together by a continuous process in one direction and in an apparatus employing a single generator and regenerating-chamber.

Another object of my invention is to utilize the waste heat in the generating-chamber.

The various features of my invention will be fully set forth in the description of the accompanying drawings, making a part of this specification, in which—

Figure 1 is a central longitudinal vertical section of my improvement. Fig. 2 is a section on line $x$ $x$, Fig. 1. Fig. 3 is a section on line $y$ $y$, Fig. 1.

1 represents the base of the cupola-furnace, 2 the hearth, and 3 tuyeres for supplying air to support combustion. 4 represents the primary combustion-chamber. 5 represents an enlarged generating and gas-mixing chamber above the primary combustion-chamber. 6 represents an uptake or flue communicating directly with the regenerating or gas-fixing chamber. 7 represents regenerative material in said chamber, which is shown composed of five passages of serpentine form filled with balls made of silicate of alumina or other substance capable of absorbing a large amount of heat without deterioration. 8 represents an exit-flue for the emission of the gas fixed in the chamber; 10, steam-pipe tapping the generating-chamber 5. This pipe 10 is shown as the termination of the superheating-coil 11, and this is the preferred form of construction; but I have found from experience that superheated steam is not essential in my process, as the heat of the generating-chamber is sufficient to decompose dry steam, though it is more economical to superheat the steam. 12 represents a bell closing the feeding-shaft 13. 14 represents a water-jacket collar for keeping the same cool. These parts are fully described in my said previous patent.

15 represents a cover for closing the feeding-shaft.

In order to more thoroughly utilize the heat, I make an annular chamber A at or near the bell, into which the air is forced for supporting combustion.

B represents a series of hollow tubes connecting said chamber A with the series of chambers C, through which the tuyere-pipes D pass. They are provided with openings $a$ for the entrance of air to the interior of the tuyeres.

E represents an air-supply pipe which leads to the fan or blowing engine, by means of which the air is forced into the annular chamber A, passes down the vertical tubes B into the segmental chamber C, and thence into the tuyere-pipes for supplying air to the base of the charge within the primary combustion-chamber.

In my process a high and continuous heat is required in order to keep up continuously a high heat in the fixing or regenerating chamber, and I have found that a small amount of steam supplied to the tuyeres and mixed with the air provides a blast that promotes combustion and raises the heat higher in the generating-chambers. The mixing of steam with the air supplied to the tuyeres is, however, not essential and the steam may be omitted, if preferred.

F represents a series of steam-pipes tapping the tuyere-pipes D. H represents valves for controlling the amount of steam admitted thereto. This steam may be taken from the superheating-coil or from a boiler, as preferred.

The mode of operation is as follows: Soft or bituminous coal is introduced into the primary combustion-chamber 4 through the feeding-shaft. The bell is lowered to admit the charge and immediately raised to seal the feed-shaft. The coal to be burned lies in the primary combustion-chamber and when ignited rapidly becomes incandescent. The heat and volatile products of combustion pass directly through the uptake 6, and thence through the regenerating-chamber. Steam is admitted by the pipes F as soon as the charge in the generator is of sufficient heat to break up the steam; but no more steam should be admitted than the combustion will take up, actively maintaining a high degree of heat. As soon as the balls at the terminal of the regenerating-chamber are raised to 1,000° or 1,200° of heat, Fahrenheit scale, the apparatus is hot enough to commence making fixed gas continuously. Steam is then admitted into the gas-generating chamber 5.

In practice I have found that a generator three feet in diameter will take all the steam which can be supplied by the inch pipe and convert it into a combustible gas by the decomposition of the steam. This chamber 5 is highly heated, there being a considerable draft furnished thereto by the ascending currents of the heated products of generation, and the steam cutting the same at right angles produces a cyclonic effect, so that there is a rapid whirling of the gas, thereby bringing it into condition for forming a fixed gas in the regenerator-chamber. The gases thus generated pass rapidly out of the flue 6 into the regenerating-chamber and, being at a higher heat, do not cool down the regenerating-chamber and material, but impart heat thereto if driven to their fullest capacity.

I have found from experience the best Youghiogheny coal, when burned under the conditions herein stated, with the full amount of steam which the same will take, is scarcely high enough for a good fuel-gas. I enrich the gas for illuminating purposes, however, by adding hydrocarbon product, and this may be done in various ways. Oil, benzine, or similar hydrocarbon liquids may be introduced through a pipe 19 into the upper part of the gas-generator. In lieu of this, however, cannel coal may be mixed with the bituminous coal or other hydrocarbons—such as pitch, rosin, by-products of petroleum—and introduced with it into the charge. If an illuminating-gas is desired, the hydrocarbon added should be sufficient to furnish from one to three per cent. of benzol vapor, and this will make rich illuminating-gas. For this purpose I prefer to employ about one-half, by weight, of benzine to the coal fed to the generator.

A material advantage is obtained in heating the air by introducing the same at the top of the generator-shaft and passing the same down through the tubes inclosed within the brick-work, which take up the waste heat, and thereby the air is admitted into the furnace hot. This promotes rapid combustion and assists in keeping the regenerating-chamber hot, as well as quickly bringing the gases to a uniform degree of heat, so that they will mix easily and form the fixed gas.

Having described my invention, what I claim is—

1. The herein-described continuous process of making gas in a single generator and regenerator, which consists in introducing at an angle into the heated and ascending currents of the volatile products of combustion from an incandescent body of carbonaceous fuel a continuous current of steam that is decomposed and thoroughly mingled with the volatile products of combustion within a highly-heated generating-chamber between the body of fuel and the gas-uptake and passing the resulting gas directly and continuously into a regenerator, substantially as described.

2. A continuous process of making gas in a single generator and regenerator, which consists in burning coal at the base of a generator-chamber, maintaining the combustion at a degree of heat high enough to decompose steam, the combustion being supported by air, introducing steam into the mixing-chamber between the body of fuel and the gas-uptake at an angle to the ascending currents of the volatile products of combustion, whereby the steam is decomposed and thoroughly mixed with the products of combustion in said mixing-chamber within the generator-shaft, and passing this product directly into the regenerator or fixing-chamber, substantially as described.

3. A continuous process of making gas in a single generator and regenerator, which consists in burning coal at the base of the generating-chamber, maintaining the combustion at a degree of heat high enough to decompose steam, the combustion being maintained by hot-air currents introduced into the primary combustion-chamber, introducing steam into the mixing-chamber between the body of fuel and the gas-uptake at an angle to the ascending currents of the volatile products of combustion, whereby the steam is decomposed and thoroughly intermixed with the products of combustion in said mixing-chamber within the generator-shaft, and passing this product directly into the regenerator or fixing-chamber, substantially as specified.

4. The continuous process of making gas in a single generator and regenerator or fixing-chamber, through which generator and regenerator the volatile products of combustion pass continuously in one direction, which consists in burning coal at the base of the generator, the combustion being supported by air forced into the same, admitting steam at an angle to the ascending currents of the products of combustion in a highly-heated generating and mixing chamber between the body of fuel and the gas-uptake, introducing a hydrocarbon liquid into the upper part of the generator, and passing the mingled gases through the regenerator to form a fixed gas, substantially as described.

5. The continuous process of making gas in a single generator and regenerator or fixing chamber, which consists in burning soft coal at the base of the generator-chamber, injecting steam and heated air into said fuel to support combustion, introducing steam above the fuel at an angle to the ascending currents of the volatile products of combustion between the body of fuel and the gas-uptake, thoroughly mingling the steam and heated products of combustion within the generator-shaft, and passing the gas directly and continuously into a regenerator or fixing-chamber, substantially as described.

In testimony whereof I have hereunto set my hand.

WILLIAM H. HARRIS.

Witnesses:
JAMES THRELKELD,
W. W. BALL.